US005745507A

United States Patent [19]
Chen

[11] Patent Number: 5,745,507
[45] Date of Patent: Apr. 28, 1998

[54] SYSTEMATIC SYMBOL LEVEL ECC FOR USE IN DIGITAL MEMORY SYSTEMS

[75] Inventor: Chin-Long Chen, Fishkill, N.Y.

[73] Assignee: International Business Machines Corporation, Armonk, N.Y.

[21] Appl. No.: 414,674

[22] Filed: Mar. 31, 1995

[51] Int. Cl.⁶ .................................................. G06F 11/10
[52] U.S. Cl. ................................................... 371/40.1
[58] Field of Search ............................. 371/40.1, 37.1, 371/37.6, 38.1, 39.1

[56] References Cited

U.S. PATENT DOCUMENTS

| | | | |
|---|---|---|---|
| 3,623,155 | 11/1971 | Hsiao | 371/37.1 |
| 4,464,753 | 8/1984 | Chen | 371/40.1 |
| 4,651,321 | 3/1987 | Woffinden et al. | 371/40.1 |
| 4,775,979 | 10/1988 | Oka | 371/38.1 |
| 4,862,463 | 8/1989 | Chen | 371/40.1 |
| 4,939,733 | 7/1990 | Furutani | 371/40.1 |
| 4,961,193 | 10/1990 | Debord et al. | 371/37.2 |
| 5,164,944 | 11/1992 | Benton et al. | 371/40.1 |
| 5,226,043 | 7/1993 | Pughe et al. | 371/40.1 |

FOREIGN PATENT DOCUMENTS 386506   9/1990   European Pat. Off. .

OTHER PUBLICATIONS

Rajpal, S. et al., "Fast error–correcting ICs aid large memory systems", Electronic Design, Feb. 19, pp. 123–126 1987.

Primary Examiner—Stephen M. Baker
Attorney, Agent, or Firm—Lawrence D. Cutter

[57] ABSTRACT

A method is provided for the construction of systematic error correction codes having double symbol error detection and single symbol correction capabilities. These systematic codes are employed in conjunction with digital memory systems in which the same electrical circuit mechanism is employed for check bit generation and syndrome generation. As a result, the number of circuit levels is reduced, the circuit operates faster, and yet at the same time efficiencies of space or chip "real estate" utilization are achieved since fewer circuits are required to achieve the same objectives, especially with respect to encoding and syndrome generation.

4 Claims, 9 Drawing Sheets

FIG. 1
Prior Art

```
                                        cccc cccc cccc
                                        0000 0000 1111
              c    c                    1234 5678 0123
              o    1
              g    4
1000 1000 1000 1000 1000 1000 1000 1000 1000 1000 1000 0000
0100 0100 0100 0100 0100 0100 0100 0100 0100 0100 0100 0000
0010 0010 0010 0010 0010 0010 0010 0010 0010 0010 0010 0000
0001 0001 0001 0001 0001 0001 0001 0001 0001 0001 0001 0000

0001 0100 0000 1001 0010 1100 0101 1110 1011 1000 0010 1000
0000 0010 1000 0100 1001 0100 1001 0010 1111 0101 0100 0001 1010 1000
1001 0101 0100 1011 0110 0011 1100 0001 1001 0010 0001 1010 1100 0110 0010 1010 0001 1100 1101 0110 010
0100 0010 0010 0001 1011 0101 0111 0001 1000 1011 0100 0110 1000 0011 0100 0001 1010 1000 1000 0001 001
0010 1001 0001 0010 0010 0101 0101 1000 1100 1100 0100 0110 0001 1010 0100 0000 1000 1000 1000 1000 000

0001 1000 0010 1001 0010 1010 1000 0000 0001 0010 1110 0101 1111 0010 1111 0101 0010 1111 0010 0100 101
0000 0100 0010 0001 1010 0101 1100 1000 1000 1101 1000 1000 1001 0110 0010 0010 1010 0010 0100 000
1001 0010 0010 0001 0000 0110 1101 0100 1011 0100 0110 0110 0001 1100 0001 1100 0110 1100 1100 0000 000
0100 0001 1001 0000 1000 0011 0110 0001 0101 0101 0001 1011 0001 1000 0110 1000 0010 0001 000
0010 0000 0000 1000 0100 0001 1010 1001 1010 0101 1001 1100 1000 1011 1100 011 0000 0000
```

```
                                    CCCC CCCC CCCC
                                    0000 0000 1111
                                    1234 5678 0123
C
0  1010 0001 1001 1010 1101 0000 0011 1110 1000 1110 1100 0000 1001 1011 0010 0000 0000
9  0110 0100 0000 1100 0000 0101 1101 0001 0111 0001 1101 0010 0101 1100 1011 1000 0000
   0010 0010 0010 0010 0010 0010 0010 0010 0010 0010 0010 0010 0010 0010 0001 0100 0000
   0001 0001 0001 0001 0001 0001 0001 0001 0001 0001 0001 0001 0001 0001 0001 0000 0000

```
                       cccc cccc cccc cc
                       0000 0000 1111 01
                       1234 6789 1234 50

SYSTEMATIC SYMBOL LEVEL ECC FOR USE IN DIGITAL MEMORY SYSTEMS

BACKGROUND OF THE INVENTION

The present invention is generally directed to error correction coding. More particularly, the present invention is directed to symbol level error correction codes based upon systematic parity check matrices which provide single symbol error correction and double symbol error detection. Even more particularly, the present invention is directed to a digital memory system employing systematic error correction coding which permits the same electrical circuit to be employed for ECC check bit generation and syndrome generation. This has the additional advantage provided by systematic codes, namely, the generation of check bits in a fashion in which the generation of each check bit is independent of the generation of other check bits.

As electronic memory systems for digital computers increase in circuit density, there is an increasing need for the incorporation of information redundancy to alleviate problems associated with soft errors arising from transient causes such as alpha particle transition through a memory cell. Certainly, it is also desirable to be able to reduce the complexity of the encoding circuits and the correspondingly necessary error correction and decoding circuitry. This is particularly desirable when one considers that it is also possible to have hardware errors in the error correction circuitry itself.

When one incorporates error correction coding circuitry into a digital memory system, there are two aspects to be considered. Firstly, when data bits are supplied as input to this memory system, it must generate the check bits that are needed for redundancy and error detection and correction. This check bit generation employs electronic circuits based upon the parity check matrix which those skilled in the ECC arts fully appreciate as describing the necessary circuitry and which also provides the structure to a code which thus endows it with the desired and designed for error correction properties, particularly its error correction and error detection capabilities. Secondly, when data is read out of the memory system, error checking must be performed and the data corrected as needed. However, in order to perform this checking, detection, and correction operation, it is generally necessary to generate a syndrome vector. This syndrome vector is also generated based upon a parity check matrix although not necessarily the same parity check matrix that was employed for encoding. In such cases it may be necessary to employ translation circuitry.

As indicated above, it is generally desirable to keep the error correction circuitry itself as simple as possible so as to particularly avoid errors that may occur in it. Furthermore, one also wishes the error correction circuitry to be able to operate as quickly as possible. For this reason it is therefore desirable that the electrical signals pass through as few levels of logic as possible. Clearly the more levels of logic it takes to process an electrical signal, the longer it is going to take to generate signals such as the check bit signals. In particular, it is to be noted that in certain codes, referred to as systematic codes, check bit generation is particularly simple and fast. It is therefore desirable to employ codes described by parity check matrices in which columns associated with check bits contain only a single non-zero entry. Such codes are said to be systematic and in such cases the generation of check bit signals can be accomplished without multi-level circuits in which the generation of certain check bits is dependent upon the generation of other check bits.

Thus it is seen that non-systematic codes exhibit several disadvantages. Most notably, they add an extra level of logic when compared to systematic codes. Furthermore, this additional level of logic requires additional circuitry which might also be prone to errors itself, particularly hardware errors known as "stuck-at" faults.

One can always manipulate a parity check matrix so as to put it into systematic form. However, when one does so, one often increases other undesirable code aspects associated with their electrical circuit requirements. In particular, for circuit simplicity it is generally desirable to employ codes based upon parity check matrices having a small number of non-zero entries. In addition to the general requirement for a low number of non-zero entries, there is also another desirable requirement in that for each row of the parity check matrix there should be a relatively small number of non-zero entries. To see the problem associated with a large number of non-zero entries in a row, consider the fact that electrical circuits are often limited in terms of the number of input signals that may be supplied to any given circuit. Thus, if seven signals must be supplied to an exclusive-OR gate which is limited to only four input signal lines, then it is necessary to construct multi-level circuits to perform this function. In such a case, the typical solution would be to employ three exclusive-OR gates. One of these exclusive-OR gates would receive four input signal lines and another exclusive-OR gate would receive three input signal lines. The outputs from these two exclusive-OR gates would be supplied to the inputs of the third exclusive-OR gate in what is in effect, a small exclusive-OR gate tree structure. Thus, delay-inducing multi-level circuits can also result from situations in which the parity check matrix has a relatively large number of non-zero entries in any given row. Therefore, while it is possible to always be able to construct a systematic code from a given parity check matrix, the resulting code may nonetheless still require relatively complex multi-level circuit implementations which therefore induce extra, unneeded levels of delay between the arrival of an input signal and the generation of an output signal.

SUMMARY OF THE INVENTION

In accordance with the present invention there is herein provided a new method for constructing symbol level error correction codes. The parity check matrix constructed is systematic in form so that check bits are generated independently. Furthermore, the syndrome is generated from the same parity check matrix which is used for encoding. In particular, the code construction method of the present invention is directed to codes which exhibit single symbol correction and double symbol detection capabilities (SSC-DSD). More particularly, the syndrome generated from the parity check matrix is used directly for decoding.

In particular, the description below provides an example of code construction in accordance with the present invention and employed in the formation of a parity check matrix for a (78, 64) code for single symbol error correction and double symbol error detection. The resulting example code, therefore, is seen to have a total of 78 bits with 64 of those bits being data bits, the remaining 14 bits being check bits.

In particular, the error correction codes employed as part of the present invention are incorporated in a digital memory system which comprises a memory array with addressable memory locations. Each location is capable of holding data bit values and check bit values with the data bit values being arranged as M symbols with b bits per symbol. A check bit generator is provided which supplies the check bits which are associated with the data bits stored in the memory array. The memory system also includes a syndrome generator which receives data values and check bit values that have been stored in the memory array. In accordance with well understood principles based upon the parity check matrix, the syndrome generator produces a syndrome value which is employed in error correction circuitry. The error correction circuitry receives the syndrome bits and the data bits and produces therefrom corrected versions of the data bits. In particular, in the present invention, the check bit generator and the syndrome generator preferably comprise the same circuit. Furthermore, in the preferred embodiments of the present invention, each check bit is generated independently of the other check bits, a result which is ensured by the utilization of systematic error correction codes, that is, error correction codes based on systematic parity check matrices.

Accordingly, it is an object of the present invention to provide a method for the construction of symbol level error correction codes which are based on systematic parity check matrices.

It is yet another object of the present invention to provide error correction circuitry which is itself simpler and therefore less prone to internal hardware error conditions.

It is still another object of the present invention to provide a digital memory system based on systematic codes.

It is also an object of the present invention to devise systematic codes.

It is a still further object of the present invention to provide a digital memory system in which the same circuit is employed for check bit generation and syndrome generation.

It is still another object of the present invention to provide error detection circuits which exhibit fewer logic circuit levels.

Lastly, but not limited hereto, it is an object of the present invention to improve the operation reliability, uptime, and data integrity associated with digital computer systems, especially computer memory systems.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 illustrates a parity check matrix in which the check bits are not independent;

FIG. 3 is a parity check matrix for illustrating the fact that systematic codes may nonetheless require extra levels of an exclusive-OR gate in a summing tree for checking parity;

FIG. 4 illustrates a parity check matrix for a (78, 64) code for single symbol error correction and double symbol error detection in accordance with the procedures and methods of the present invention;

DETAILED DESCRIPTION OF THE INVENTION

Figure 2:
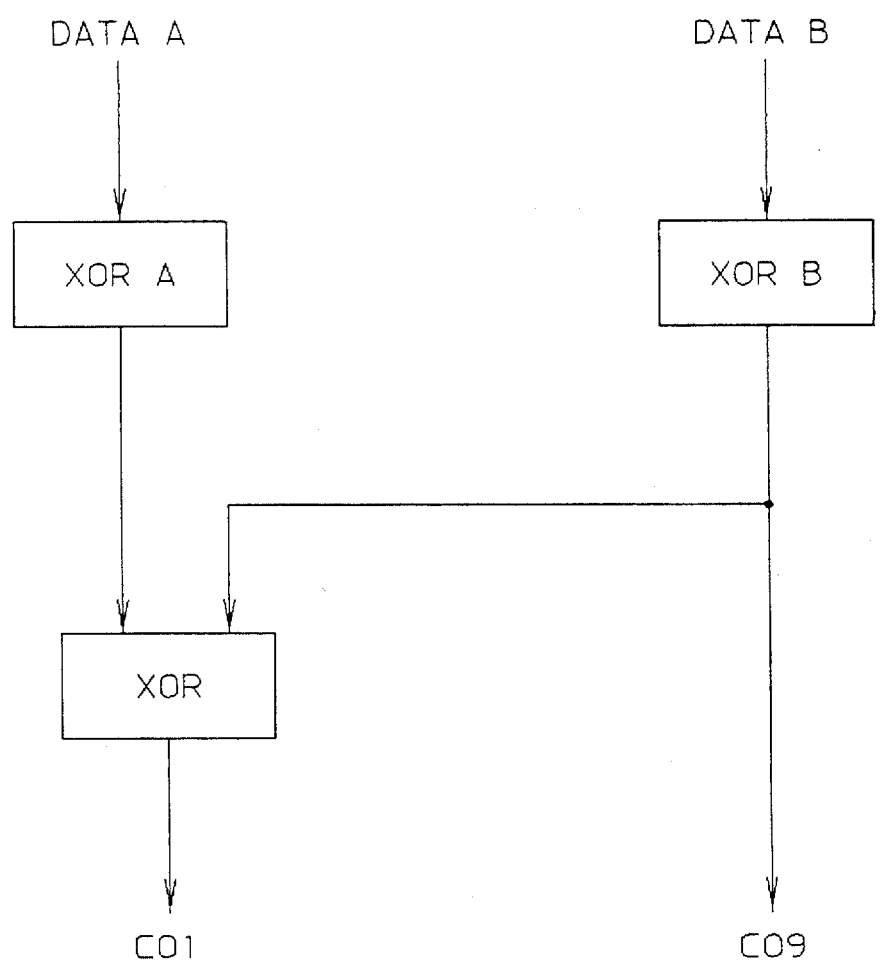
FIG. 2 is a logic circuit diagram for illustrating the multi-level and failure problems associated with error correction codes in which the check bits are not independent.

An example of a parity check matrix for a non-systematic code is illustrated in FIG. 1. This matrix is the same one that is described in U.S. Pat. No. 4,862,463 which is also assigned to the same assignee as the present invention. This matrix describes a (79, 65) code used for single symbol error correction and double symbol error detection where the symbol size is 4 bits. The check bit positions are indicated by the character "C" above the dashed line in the figure. There are 14 check bit positions labelled C01 through C14. Note in particular that the column associated with check bits C09 and C14 have three non-zero entries. Consider first check bit 9, that is, C09. The first non-zero entry occurs in the first row and it is also seen that there is a non-zero entry in the first row corresponding to check bit 1, that is, C01. Likewise, check bit 9 has a non-zero entry in row 10. Scanning across the parity check matrix in FIG. 1, one finds also that check bit 10 in row 10 (the 10's being a coincidence here) also has a non-zero entry. Thus it can be seen that check bits 1 and 9, that is, bits C01 and C10 depend on the value of check bit 9, that is, C09. While it is also seen that check bit 9 has a non-zero entry in row 9 it is further seen, by scanning across the parity check matrix in row 9, that there are no other check bits with non-zero entries for row 9. Thus it is seen that check bits 10 and 11 depend on the value of check bit 9. In a similar fashion, it is seen that check bits 2 and 7 depend upon check bit 14. As a consequence of this dependence, one additional level of logic delay is required to generate check bits 1, 10, 2 and 14, that is, C01, C10, C02, and C14. This additional level of circuitry is illustrated in FIG. 2.

Additionally, there is another problem associated with the dependent check bit problem. In particular, it is seen that the hardware that is employed to generate such dependent check bit signals can produce a situation in which the error propagates to more than one check bit. Consider for example, the circuit shown in FIG. 2 which illustrates one set of data bits (data A) going to exclusive-OR gate XOR A. Likewise another set of data bit signals (data B) are supplied to exclusive-OR gate (or exclusive-OR gate tree) XOR B. Thus exclusive-OR gate trees A and B generate parity check signals which are supplied to yet another level of exclusive-OR gate which, for example, in accordance with the discussion above, generates check bit C01. While check bit C09 is generated independently of the other check bits it is seen that C01 is generated in a dependent fashion. Thus, a failure in exclusive-OR gate B in FIG. 2 would represent a point of failure which would cause error propagation to more than one check bit. Clearly, this is an undesirable characteristic for an error detection or correction system.

One solution to the problem associated with dependent check bit generation is the reformatting of the parity check matrix so as to put it in a systematic form in which all check bits are generated independently. For example, the matrix shown in FIG. 1 can be transformed into the matrix shown in FIG. 3. It is noted that, for the matrix in FIG. 3, all of the check bits, C01 through C14, are generated independently of one another. However, in the parity check matrix in FIG. 3, the number of logic delay levels remains the same since the number of data bits involved in the calculation of C10, for example, is increased. This increase produces fan in difficulties which result in more levels in the parity tree.

Figure 3:
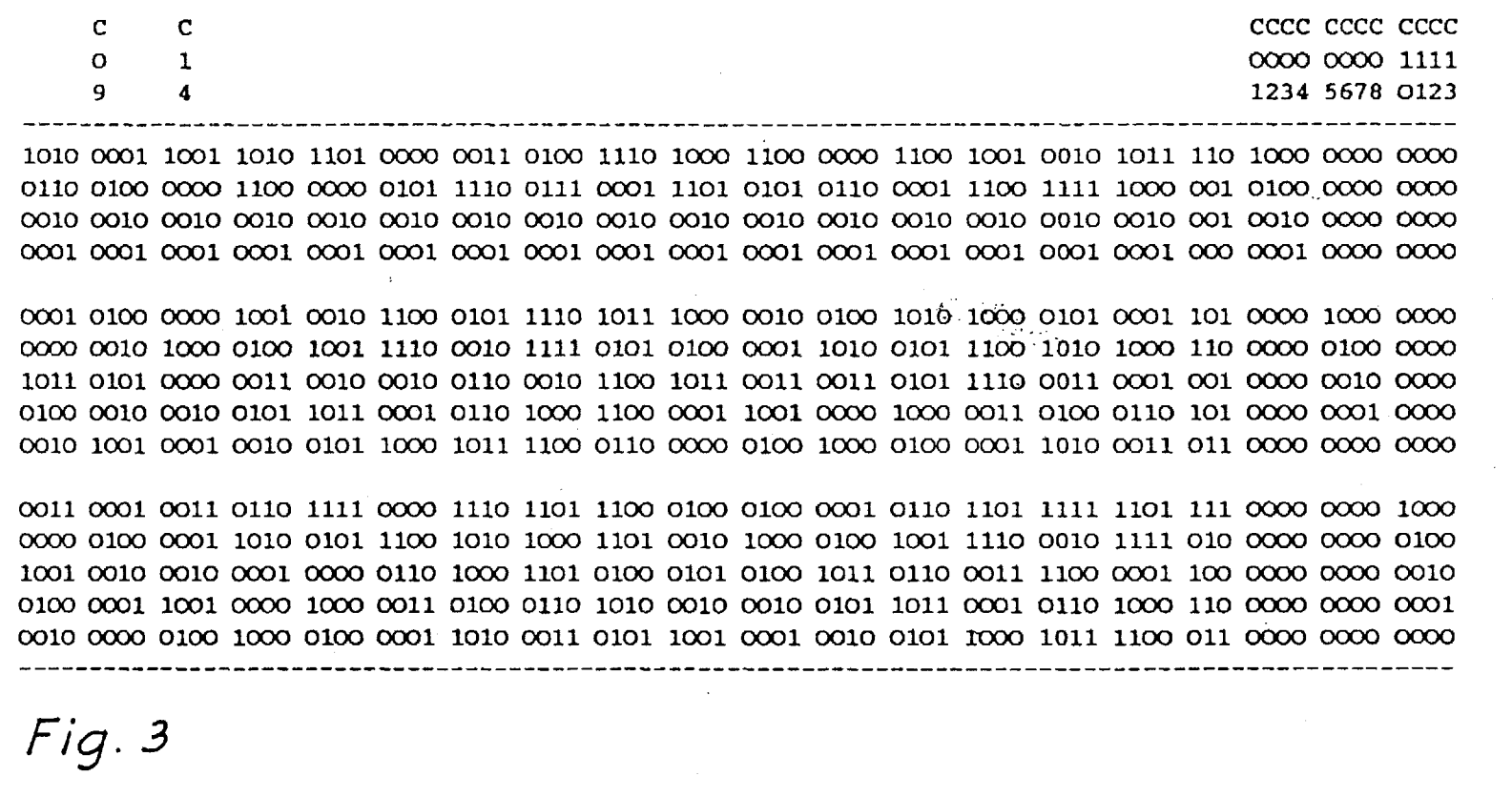

Another drawback for the code seen in FIG. 3 is that the error syndrome still has to be generated from matrix A in FIG. 1. Thus, two different circuits have to be designed, one for check bit generation and memory system store operation and another one for syndrome generation during memory fetch operations. Thus if the matrix in FIG. 3 is used for syndrome generation, then a transformation is required before the code signals can be decoded. Such a transformation operation adds circuit complexity and also thus enhances the chances for hardware errors and error propagation.

Accordingly, the invention herein provides a new way for constructing symbol level error correction codes. The parity check matrix is constructed such that it has a systematic form so that the check bits can be generated independently of one another. The syndrome generated from the parity check matrix may thus be used directly for error decoding.

Figure 4:
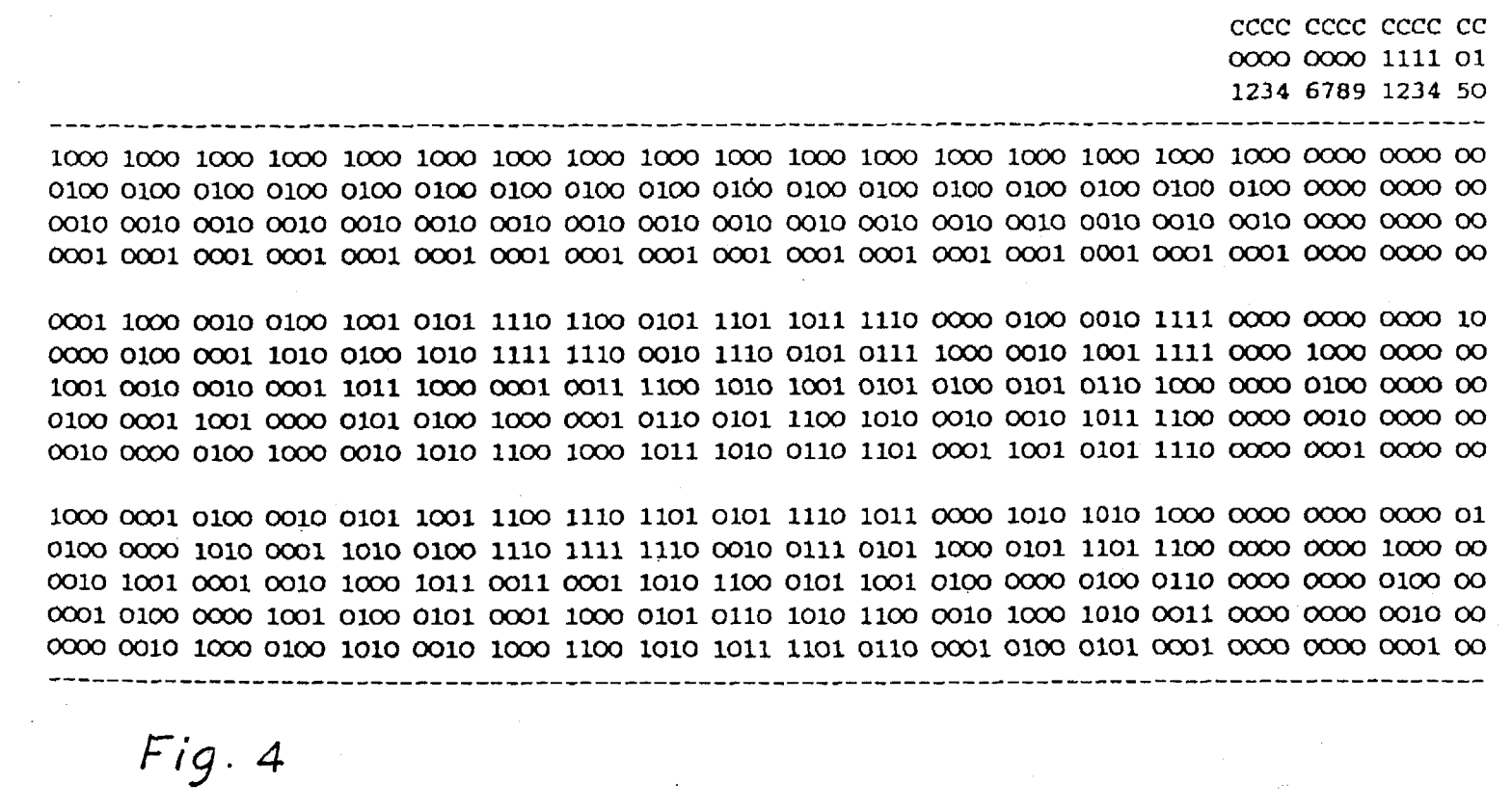

There is now described the method for code construction that was employed in the generation of the (78, 64) code shown in FIG. 4. In particular, it is noted that this code has nineteen symbols of size four and one symbol of size two in the code words. Note also that the submatrix of the first four rows has at most one non-zero entry in each column. This property readily provides the symbol error pattern used in decoding. Note also that each check bit column has only a single non-zero entry. That is, that the check bits are independent. The generation of check bits is straightforward and is accomplished by exclusive-ORing together the data bits whose positions are indicated by the ones in a row of the parity check matrix.

The code shown in FIG. 4 is derived from a general procedure. In particular, let a be a root of the binary primitive polynomial $p(x)=1+x^2+x^5$. Then $\alpha^i$ can be expressed in a binary vector representation as $\alpha^i = a_0 + a_1\alpha + a_2\alpha^2 + a_3\alpha^3 + a_4\alpha^4$, where the coefficients $a_k$ are binary for k=0, 1, 2, 3, 4. Now let $$H = \begin{bmatrix} & & 1 & 0 & 0 \\ H_1 & H_2 & 0 & 1 & 0 \\ & & 0 & 0 & 1 \end{bmatrix},$$

where $$H_1 = \begin{bmatrix} 1 & 1 & 1 & 1 & 1 & 1 & 1 & 1 & 1 & 1 & 1 & 1 & 1 & 1 & 1 & 1 \\ 1 & \alpha & \alpha^2 & \alpha^3 & \alpha^4 & \alpha^5 & \alpha^6 & \alpha^7 & \alpha^8 & \alpha^9 & \alpha^{10} & \alpha^{11} & \alpha^{12} & \alpha^{13} & \alpha^{14} & \alpha^{15} \\ 1 & \alpha^{-1} & \alpha^{-2} & \alpha^{-3} & \alpha^{-4} & \alpha^{-5} & \alpha^{-6} & \alpha^{-7} & \alpha^{-8} & \alpha^{-9} & \alpha^{-10} & \alpha^{-11} & \alpha^{-12} & \alpha^{-13} & \alpha^{-14} & \alpha^{-15} \end{bmatrix},$$

and where $$H_2 = \begin{bmatrix} 1 & 1 & 1 & 1 & 1 & 1 & 1 & 1 \\ \alpha^{16} & \alpha^{18} & \alpha^{22} & \alpha^{24} & \alpha^{25} & \alpha^{27} & \alpha^{29} & \alpha^{30} \\ \alpha^{-16} & \alpha^{-18} & \alpha^{-22} & \alpha^{-24} & \alpha^{-25} & \alpha^{-27} & \alpha^{-29} & \alpha^{-30} \end{bmatrix}.$$

Matrix $H_2$ is selected so that the second row contains all of the different elements $\alpha^i$ for $16 \leq i \leq 30$ such that the binary vector representation of $\alpha^j = 1/(\alpha^i + \alpha^{-i})$ has a coefficient of one at the constant term and each $\alpha^j$ is of the form $a_0 + a_1\alpha^1 + a_2\alpha^2 + a_3\alpha^3 + a_4\alpha^4$ with $a_0 = 1$.

Now in order to describe the parity check matrix H in its binary form each entry of H is replaced by its 5×5 binary companion matrix equivalent. For example, the companion matrix for $\alpha = a_0 + a_1\alpha + a_2\alpha^2 + a_3\alpha^3 + a_4\alpha^4$ is the following matrix:

$$T = \begin{bmatrix} 0 & 0 & 0 & 0 & a_0 \\ 1 & 0 & 0 & 0 & a_1 \\ 0 & 1 & 0 & 0 & a_2 \\ 0 & 0 & 1 & 0 & a_3 \\ 0 & 0 & 0 & 1 & a_4 \end{bmatrix}$$

and the companion matrix for $\alpha^j$ is $T^j$. When this substitution is made, it is seen as the equivalent binary parity check matrix H, has 15 rows and 135 columns. The first column of each companion matrix is consistently deleted. The resultant matrix thus has 15 rows and 108 columns. Since the first row of a binary matrix contains all zeroes, this row may also be deleted. The resultant is a matrix H* with 14 rows and 108 columns, the end of which has been concatenated with the vectors (0 0 0 0 1 0 0 0 0 0 0 0 0) and (0 0 0 0 0 0 0 0 1 0 0 0 0) as two columns. The matrix H* can then be used as the parity check matrix of a single symbol correcting and double symbol detecting code. The final resultant parity check matrix shown in FIG. 4 is the code which is obtained from H* by deleting symbol submatrices in groups of 4 columns as need per specific code design size requirements.

When data is sent from the memory array, in accordance with the present invention, the error syndrome of the data is generated from the same parity check matrix that was used to encode the data. The following procedure is used to identify the symbol error location and the symbol error pattern if the errors are correctable, and to generate an uncorrectable error (UE) signal if the errors are not correctable. In the listing below the syndrome, S, is represented by the vector (S1, S2, . . . , S14). For convenience herein, no difference in meaning should be ascribed to the symbols S1 and $S_1$. Furthermore, in the listing below $E_i$ for i=1, 2, . . . , 20 are the symbol error indicators (also designated as E1, E2, . . . , E20). These indicators are generated from the logical operations listed below. In this listing, it is to be particularly noted that the equal sign is employed in two senses which should not be confusing in the present context. In particular, when the equal sign appears between braces it represents the logical operation of equivalence testing. It is the logical inverce of the exclusive-OR operation. The exclusive-OR operation is also designated by the symbol "XOR". Similarly, adjacent positioning of the braces denotes a logical "AND" operation. Because of space limitations, these logical "AND" operations sometimes extend over multiple lines.

As above, let S=(S2, S2, . . . , S14) be the syndrome. Let Ei, i=1, 2, . . . , 20, be the symbol error indicators. These indicators are generated from the following logical operations:

TABLE I

E1 = {S5 = S4 }{S6 = 0}{S7 = (S1 XOR S4 )}{S8 = S2 }
     {S9 = S3 }{S10 = S1 }{S11 = S2 }{S12 = S3 }{S13 = S4 }
     {S14 = 0}

E2 = {S5 = S1 }{S6 = S2 }{S7 = S3 }{S8 = S4 }{S9 = 0}
     {S10 = S4 }{S11 = 0}{S12 = (S1 XOR S4 )}{S13 = S2 }
     {S14 = S3 }

E3 = {S5 = S3 }{S6 = S4 }{S7 = S3 }{S8 = (S1 XOR S4 )}
     {S9 = S2 }{S10 = S2 }{S11 = (S1 XOR S3 )}{S12 = S4 }
     {S13 = 0}{S14 = S1 }

E4 = {S5 = S2 }{S6 = (S1 XOR S3 )}{S7 = S4 }{S8 = 0}
     {S9 = S1 }{S10 = S3 }{S11 = S4 }{S12 = S3 }
     {S13 = (S1 XOR S4 )}{S14 = S2 }

E5 = {S5 = (S1 XOR S4 )}{S6 = S2 }{S7 = (S1 XOR S3 XOR S4 )}
     {S8 = (S2 XOR S4 )}{S9 = S3 }{S10 = (S2 XOR S4 )}
     {S11 = (S1 XOR S3 )}{S12 = S1 }{S13 = S2 }
     {S14 = (S1 XOR S3 )}

E6 = {S5 = (S2 XOR S4 )}{S6 = (S1 XOR S3 )}{S7 = S1 }
     {S8 = S2 }{S9 = (S1 XOR S3 )}{S10 = (S1 XOR S4 )}
     {S11 = S2 }{S12 = (S1 XOR S3 XOR S4 )}
     {S13 = (S2 XOR S4 )}
     {S14 = S3 }

E7 = {S5 = (S1 XOR S2 XOR S3 )}
     {S6 = (S1 XOR S2 XOR S3 XOR S4 )}{S7 = S4 }{S8 = S1 }
     {S9 = (S1 XOR S2 )}{S10 = (S1 XOR S2 )}
     {S11 = (S1 XOR S2 XOR S3 )}{S12 = (S3 XOR S4 )}
     {S13 = S4 }{S14 = S1 }

E8 = {S5 = (S1 XOR S2 )}{S6 = (S1 XOR S2 XOR S3 )}
     {S7 = (S3 XOR S4 )}{S8 = S4 }{S9 = S1 }
     {S10 = (S1 XOR S2 XOR S3 )}
     {S11 = (S1 XOR S2 XOR S3 XOR S4 )}{S12 = S4 }
     {S13 = S1 }{S14 = (S1 XOR S2 )}

E9 = {S5 = (S2 XOR S4 )}{S6 = S3 }{S7 = (S1 XOR S2 )}
     {S8 = (S2 XOR S3 )}{S9 = (S1 XOR S3 XOR S4 )}
     {S10 = (S1 XOR S2 XOR S4 )}{S11 = (S1 XOR S2 XOR S3 )}
     {S12 = (S1 XOR S3 )}{S13 = (S2 XOR S4 )}
     {S14 = (S1 XOR S3 )}

E10 = {S5 = (S1 XOR S2 XOR S4 )}{S6 = (S1 XOR S2 XOR S3 )}
      {S7 = (S1 XOR S3 )}{S8 = (S2 XOR S4 )}
      {S9 = (S1 XOR S3 )}
      {S10 = (S2 XOR S4 )}{S11 = S3 }{S12 = (S1 XOR S2 )}
      {S13 = (S2 XOR S3 )}{S14 = (S1 XOR S3 XOR S4 )}

E11 = {S5 = (S1 XOR S3 XOR S4 )}{S6 = (S2 XOR S4 )}
      {S7 = (S1 XOR S4 )}{S8 = (S1 XOR S2 )}
      {S9 = (S2 XOR S3 )}
      {S10 = (S1 XOR S2 XOR S3 )}{S11 = (S2 XOR S3 XOR S4 )}
      {S12 = (S2 XOR S4 )}{S13 = (S1 XOR S3 )}
      {S14 = (S1 XOR S2 XOR S4 )}

E12 = {S5 = (S1 XOR S2 XOR S3 )}{S6 = (S2 XOR S3 XOR S4 )}
      {S7 = (S2 XOR S4 )}{S8 = (S1 XOR S3 )}
      {S9 = (S1 XOR S2 XOR S4 )}{S10 = (S1 XOR S3 XOR S4 )}
      {S11 = (S2 XOR S4 )}{S12 = (S1 XOR S4 )}
      {S13 = (S1 XOR S2 )}{S14 = (S2 XOR S3 )}

E13 = {S5 = 0}{S6 = S1 }{S7 = S2 }{S8 = S3 }{S9 = S4 }
      {S10 = 0}{S11 = S1 }{S12 = S2 }{S13 = S3 }{S14 = S4 }

E14 = {S5 = S2 }{S6 = S3 }{S7 = (S2 XOR S4 )}{S8 = S3 }
      {S9 = (S1 XOR S4 )}{S10 = (S1 XOR S3 )}
      {S11 = (S2 XOR S4 )}
      {S12 = 0}{S13 = S1 }{S14 = S2 }

E15 = {S5 = S3 }{S6 = (S1 XOR S4 )}{S7 = (S2 XOR S3 )}
      {S8 = (S1 XOR S3 XOR S4 )}{S9 = (S2 XOR S4 )}
      {S10 = (S1 XOR S3 )}{S11 = (S1 XOR S2 XOR S4 )}
      {S12 = S2 }
      {S13 = (S1 XOR S3 )}{S14 = (S2 XOR S4 )}

E16 = {S5 = (S1 XOR S2 XOR S3 XOR S4 )}
      {S6 = (S1 XOR S2 XOR S3 XOR S4 )}{S7 = S1 }
      {S8 = (S1 XOR S2 )}{S9 = (S1 XOR S2 XOR S3 )}
      {S10 = S1 }
      {S11 = (S1 XOR S2 )}{S12 = (S2 XOR S3 )}
      {S13 = (S3 XOR S4 )}
      {S14 = S4 }

E17 = {S5 = 0}{S6 = 0}{S7 = 0}{S8 = 0}{S9 = 0}{S10 = 0}
E18 = {S1 = 0}{S12 = 0}{S13 = 0}{S14 = 0}
      {S1 = 0}{S2 = 0}{S3 = 0}{S4 = 0}{S5 = 0}
      {S10 = 0}{S11 = 0}{S12 = 0}{S13 = 0}{S14 = 0}
E19 = {S1 = 0}{S2 = 0}{S3 = 0}{S4 = 0}{S5 = 0}
      {S6 = 0}{S7 = 0}{S8 = 0}{S9 = 0}{S10 = 0}
E20 = {S1 = 0}{S2 = 0}{S3 = 0}{S4 = 0}{S6 = 0}{S7 = 0}
      {S8 = 0}{S9 = 0}{S11 = 0}{S12 = 0}{S13 = 0}{S14 = 0}

The example herein has been described in terms of electrical coding systems in which b, the number of bits per symbol, is 4. However, the construction of single symbol error correction and double symbol error detection codes can be generalized to any symbol size.

In the general case, let m=b+1, where b is the desired number of bits per symbol. The parity check matrix, and thus, the encoding circuit and decoding circuit is constructed as follows:

$$H = \begin{bmatrix} I & 0 & 0 \\ H_1 H_2 0 & I & 0 \\ 0 & 0 & I \end{bmatrix},$$

where $$H_1 = \begin{bmatrix} I & I & \ldots & I & I \\ I & T & \ldots & T^i & T^{2^{b-1}} \\ I & T^{-1} & \ldots & T^{-i} & T^{1-2^b} \end{bmatrix},$$

and where $$H_2 = \begin{bmatrix} I & \ldots & I \\ T^{j_1} & \ldots & T^{j_k} \\ T^{-j_1} & \ldots & T^{-j_k} \end{bmatrix}$$

where T is the companion matrix of a which is a root of a primitive polynomial of degree m and the exponents of T in $H_2$ are selected such that $T^j=1/(T^i+T^{-i})$ for some $2^b \leq i \leq 2^m-2$, and the binary vector representation of $T^j$ has a coefficient of "one" as the constant term. Next, the first column of each companion matrix is consistently deleted, and the first row of H is also deleted. The resultant matrix is then concatenated with two particular binary vectors of length 3m−1: one vector has a single "one" at the $m^{th}$ bit position and the other has a single "one" at the $2m^{th}$ bit position.

Figure 5:
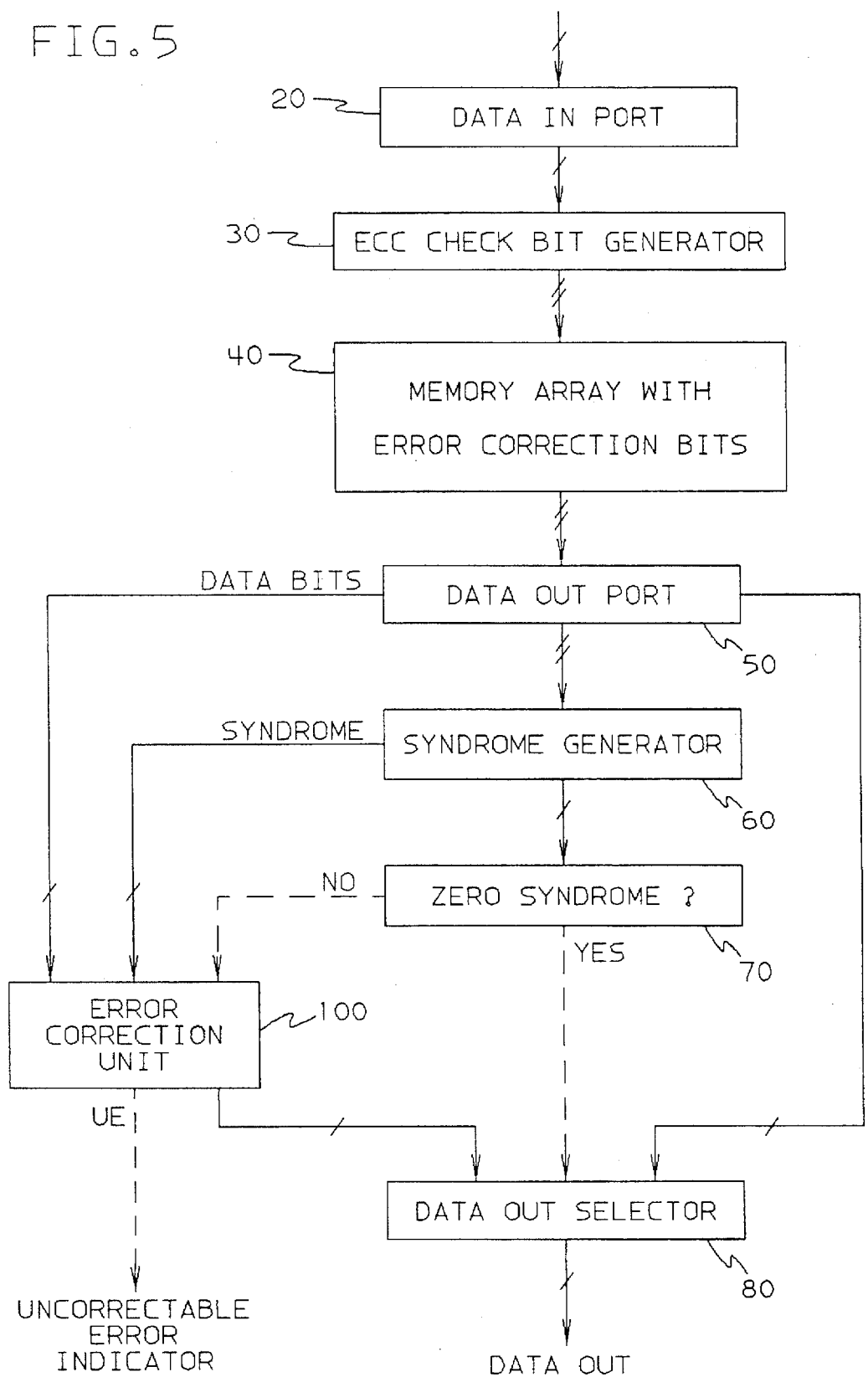
FIG. 5 illustrates a functional block diagram for a digital memory system in accordance with the present invention.

FIG. 5 illustrates a digital memory system employing the present invention. In particular, there is shown data-in port 20 which receives external data supplied to the memory system. If not already present, check bits are added to this data by ECC check bit generator 30. This data is then supplied to memory array 40 which is of sufficient size to include not only the data bits but the added ECC check bits.

In keeping with the symbol level encoding, decoding and error correction properties of codes constructed in accordance with the present invention, memory array 40 is typically implemented as a plurality of circuit chips. Best utilization of the present invention occurs when the bits for a specific symbol arise from the same chip.

Upon data-readout from memory array 40, in accordance with an address supplied thereto, data is supplied to data-out port 50. As part of the error correction system, the output data, check bits included, is supplied to syndrome generator 60. For the example code shown herein, the syndrome is a 14-bit binary vector. The syndrome vector is supplied along with the output data bits to error correction unit 100. This unit is discussed in more detail below in FIGS. 6 through 8. Zero syndrome tester 70 determines whether or not the syndrome vector is entirely zeroes. If so, it sends a control signal to data selector 80 which typically comprises an array of multiplexor units. The zero syndrome signal from syndrome tester 70 is employed as a selector signal to control whether the data output is supplied from data-out port 50 directly or from error correction unit 100.

For ease of understanding, certain conventions have been employed with respect to FIG. 5. In particular, single bit data control lines are shown as dashed. Signal lines which incorporate multiple bits are shown with a single or double hatch mark (/ or //). In particular, signal lines which include both data and check bits are shown with a pair of hatch marks (//). Other lines are shown with a single hatch mark (/). In addition, the signal paths from error correction unit 100 to data-in port 20 provides a mechanism for correcting memory contents in those situations where errors have been detected. Error correction unit 100 also preferably provides an indication that an uncorrectable error has occurred.

Figure 8:
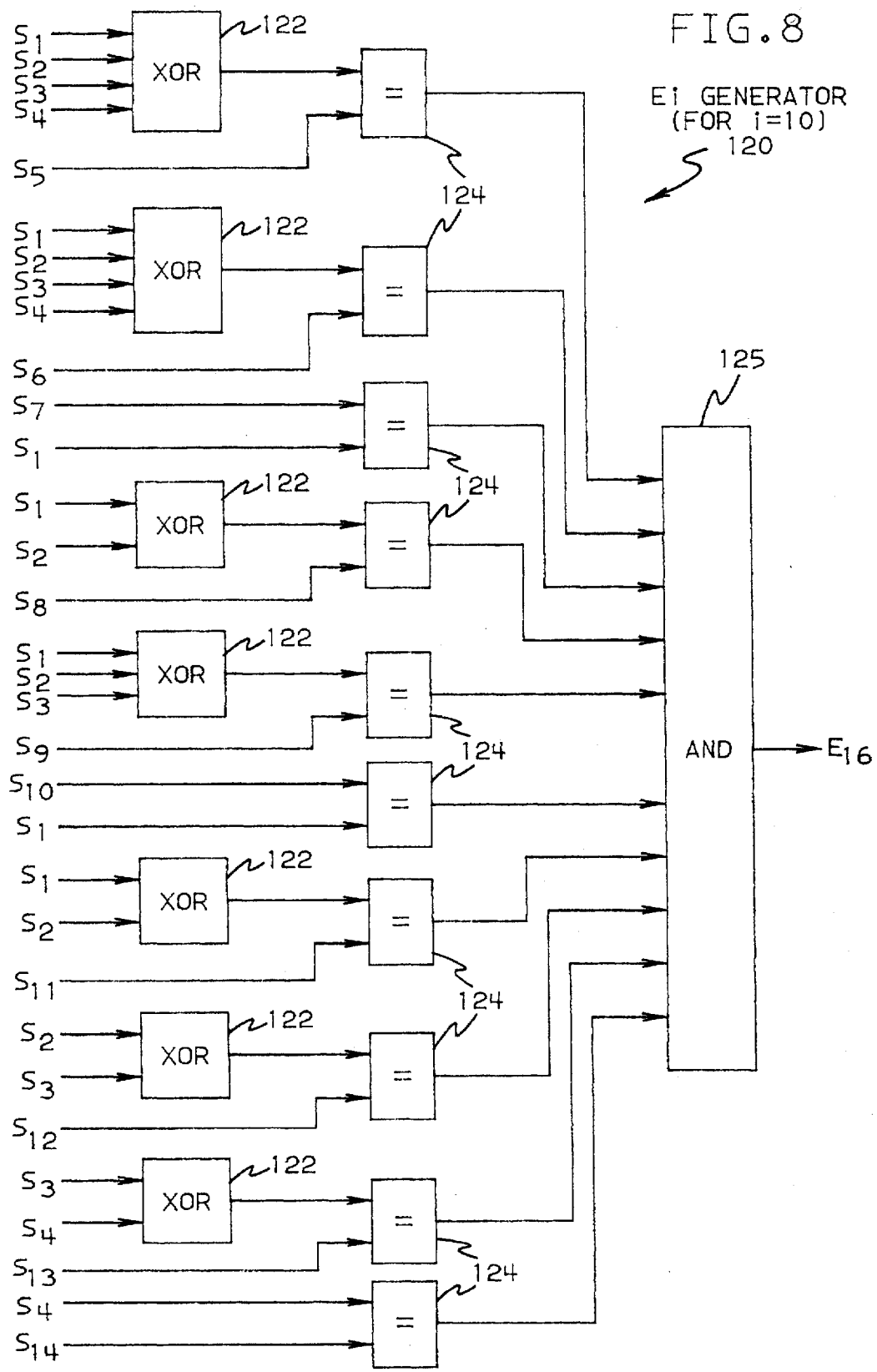
FIG. 8 illustrates a functional block diagram for an example one of the circuits for generating error indicator $E_i$.

Attention is next directed to the circuit 100 which is employed to perform the error correction function. Therefore, attention is directed to FIG. 6. In particular, it is noted that, in this figure, which is specifically directed to the code illustrated in FIG. 4, the data bits are broken down into sixteen sets of four bit symbols labelled $D_1$–$D_{16}$. Each symbol also has bits 1 through 4 designated, for example, in the first symbol as $D_{1(1)}$, $D_{1(2)}$, $D_{1(3)}$, and $D_{1(4)}$. Thus all 64 (=4×16) data bits are supplied to error correction unit 100. Error correction unit 100 also receives syndrome bits $S_1$–$S_{14}$. In accordance with the listing shown in Table I above, there is also provided a mechanism for generating an error indication $E_i$ for each of the 16 data symbols. These error indicators are provided by $E_i$ generator 120. Each $E_i$ is generated in accordance with its corresponding listing in Table I. However, selecting as an example one of the more complicated ones of these signals, a particular circuit diagram is shown in FIG. 8, which is discussed below.

Figure 6:
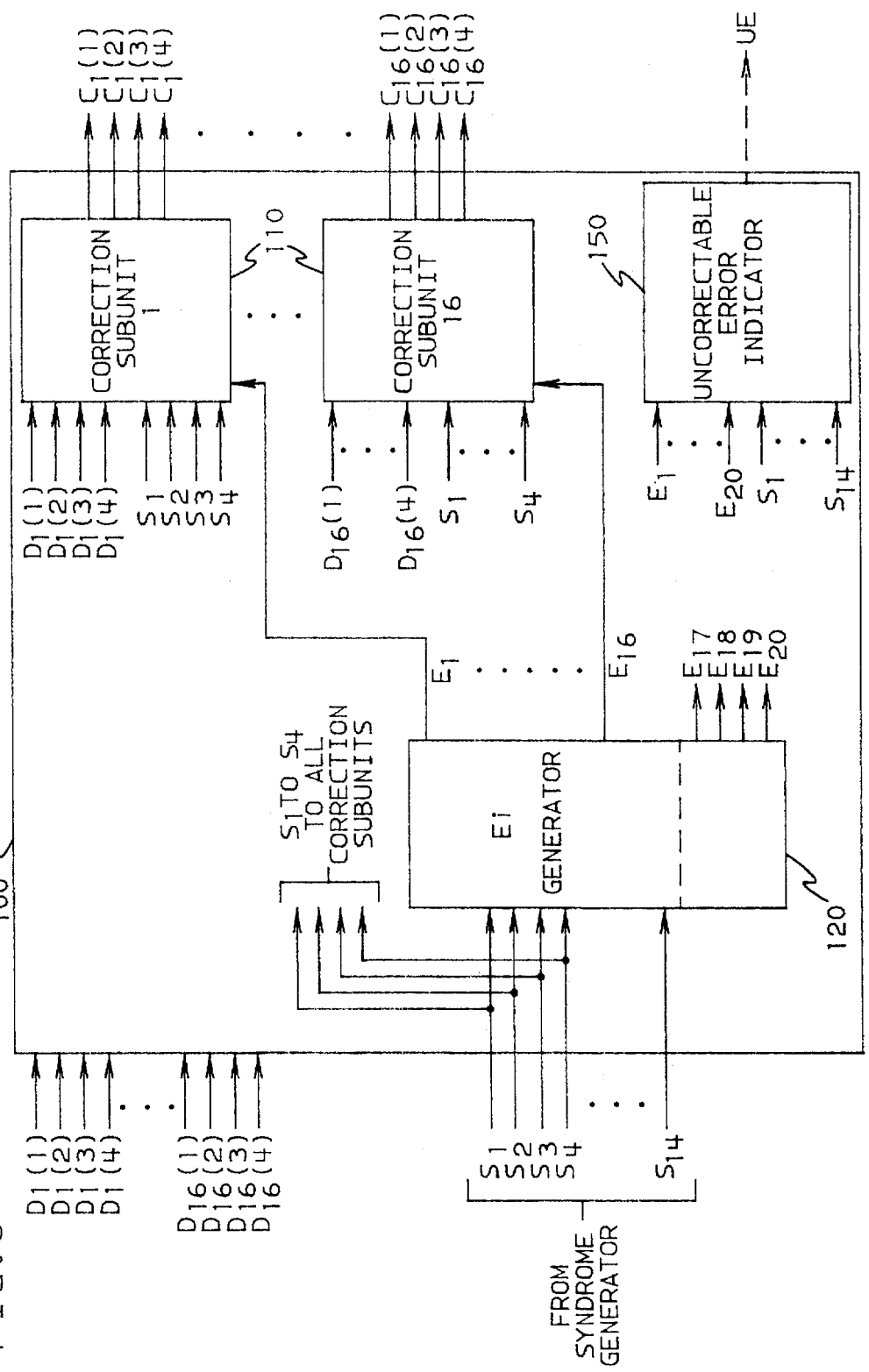
FIG. 6 illustrates a functional block diagram of the error correction unit shown in FIG. 5.
Figure 7:
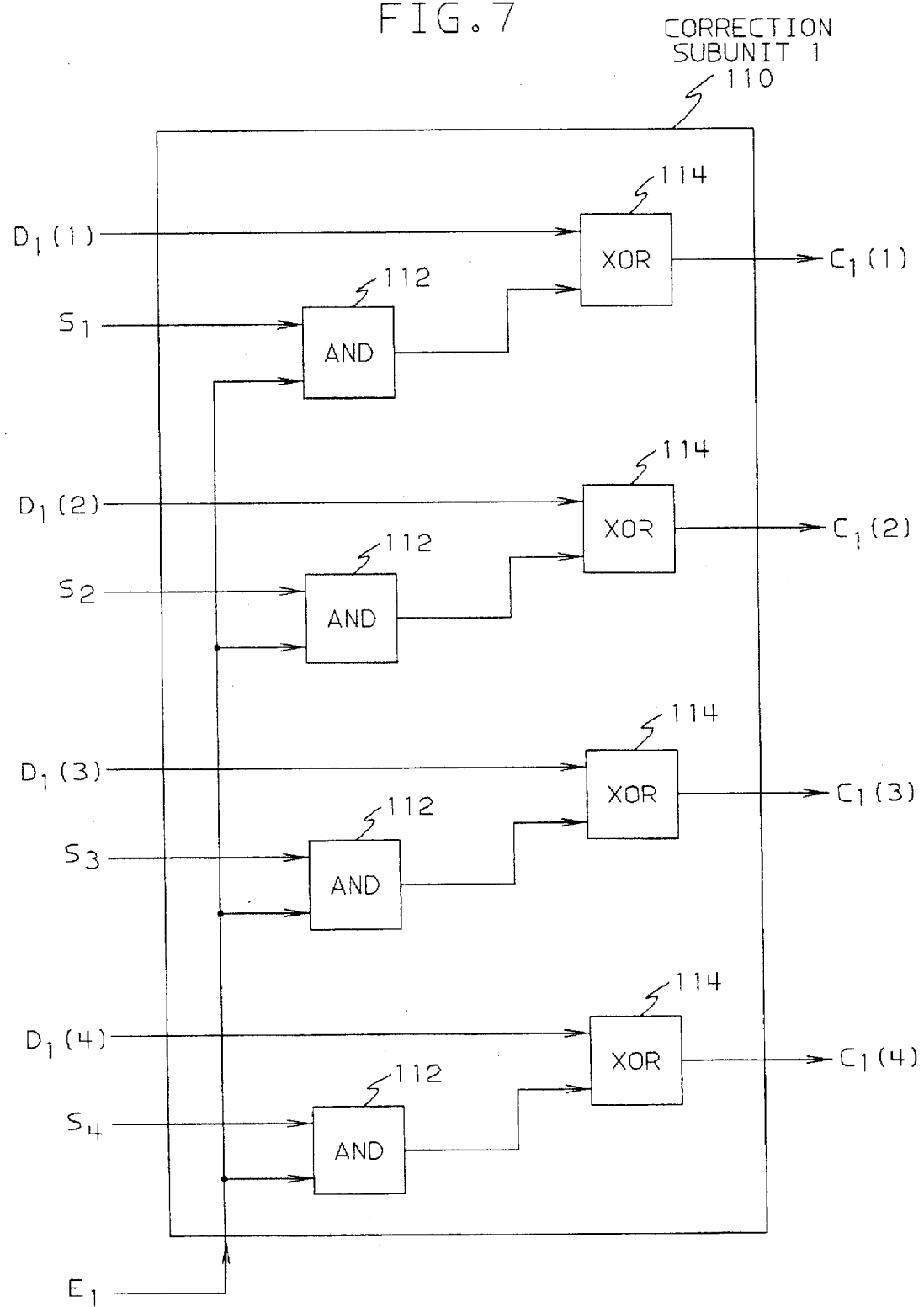
FIG. 7 illustrates a functional block diagram for the first one of the correction subunits shown in FIG. 6.

Each of the signals $E_i$ determines whether or not a correction is to be made to the corresponding data symbol. This control is effected by means of signal $E_i$ provided to correction subunit 110. The correction subunit for symbol 1 is particularly illustrated in FIG. 7. Each correction subunit 110 receives four data bit signals from its corresponding symbol. Additionally, if the signal $E_i$ indicates that an error is present in that symbol, AND gate 112 allows the correction of that symbol by exclusive-ORing the data bit with the corresponding one of syndrome signals $S_1$, $S_2$, $S_3$, and $S_4$ as shown in FIGS. 6 and 7. Thus the first four syndrome bit signals $S_1$ through $S_4$ are commonly supplied to each of error corrections subunits 110. The corresponding corrected output symbol bits $C_{1(1)}$–$C_{1(4)}$ for the first data symbol are supplied from exclusive-OR gates 114 in correction subunit 110. This is shown in FIG. 7. Whether or not correction is made to any one of the data symbols is controlled by the corresponding error indication signal $E_i$. Thus, in FIG. 7, signal $E_1$ is supplied as an input to each one of AND gates 112.

Error correction unit 100 also preferably includes uncorrectable error indicator circuit 150. This circuit is supplied with the full set of syndrome bits $S_1$–$S_{14}$ together with the full set of error indicators $E_1$–$E_{20}$. Please note here that signals $E_{17}$–$E_{20}$ were not necessary for symbol correction but are necessary for the determination of whether or not an uncorrectable error has occurred. The uncorrectable error signal is turned on if at least one of the syndrome bits is on and none of the symbol error indicators $E_i$ is on. That is:

UE={S1 or S2 or ... S14} {E1=E2 =... =E20=0}.

Figure 9:
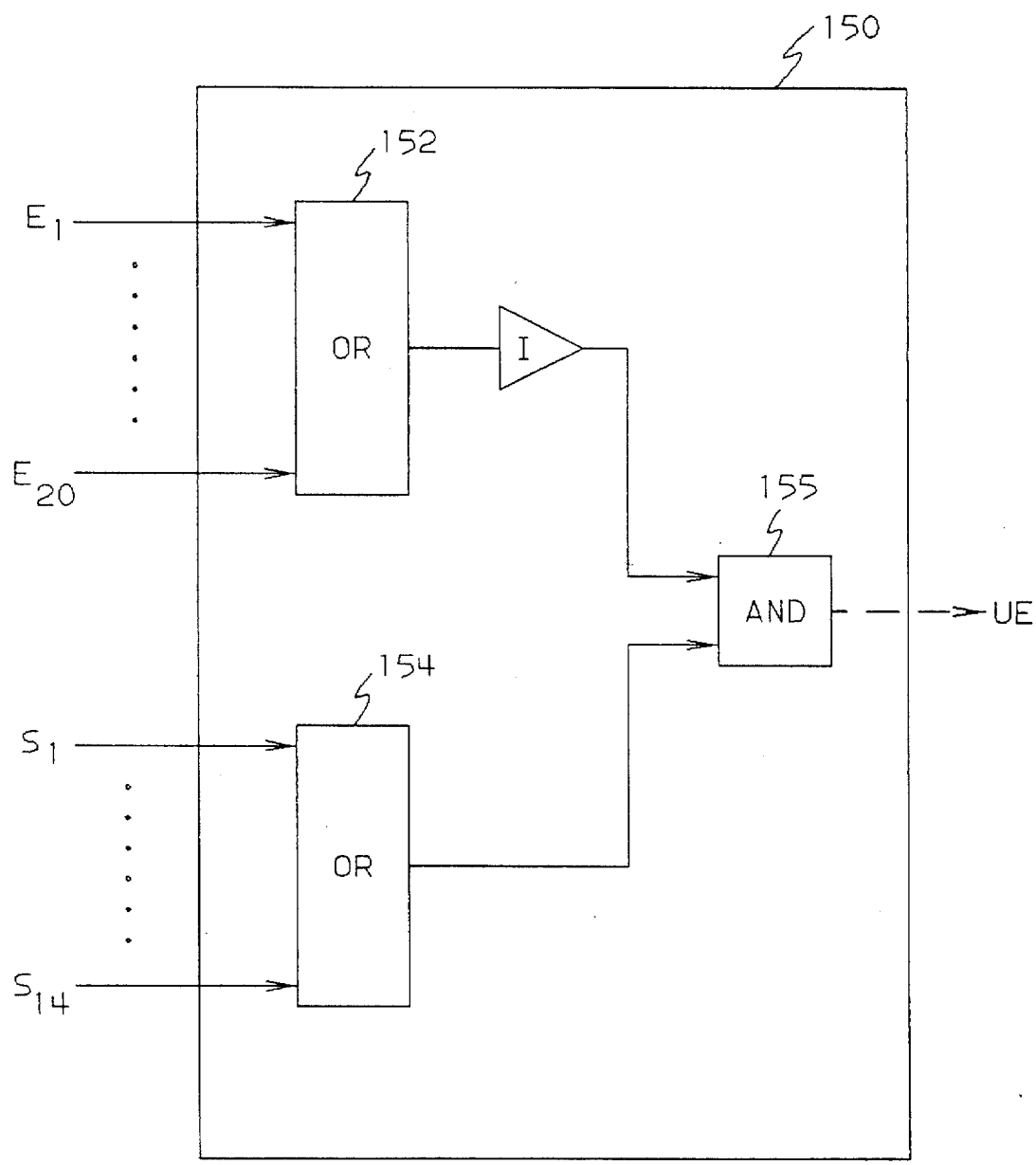
FIG. 9 is a functional block diagram illustrating the electrical circuits employed in the generation of an uncorrectable error (UE) indication.

This logical equation in implemented by the circuit shown in FIG. 9. In particular, error indicator circuits are provided by equivalence function logic block 152 and OR gate 154 which receive error indicators and syndrome bits respectively. The outputs of gates 152 and 154 are supplied to AND gate 155 whose output is supplied as the uncorrectable error indicator (UE).

As a specific example of an error indication generator circuit, attention is directed to FIG. 8 wherein the circuit which generates $E_{16}$ is shown. As generally indicated by the listing in Table I, the error indicator circuits are (at least logically) a 3-level circuit comprising a layer of exclusive-OR gates 122, followed by a layer of equivalence logic block 124, followed finally by AND gate circuit 125. The sole input signal to OR gates 122 and equivalence blocks 124 are the syndrome bits. These will vary from code to code. However, those syndrome bits for the code of FIG. 4 are shown in FIG. 8 for $E_{16}$. The other error indicator signals are generated in the same manner shown from the listing of Table I.

From the above, it should be appreciated that the code, coding methodology, and digital memory system described above fully and completely fulfill all of the objects stated above. In particular, the present invention provides an error correction circuit and system with fewer circuits and which operates at a faster speed because of the reduced number of logic levels required. It is further seen that the invention enhances the utilization of error correction in conjunction with computer memory systems without the use of dependent check bits.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A digital memory system comprising:

a memory array with addressable memory locations capable of holding data bit values and check bit values at said locations, said data bit values being arranged as M symbols with b bits per symbol, wherein b is greater than one;

a check bit generator for generating check bits for memory store operations;

a syndrome generator receiving data bit and check bit values from said memory locations for producing a syndrome vector; and error correction circuit means receiving said syndrome and said data bits and producing therefrom corrected data bits, wherein said check bit generator and said syndrome generator are the same circuit and wherein said error correction means is operable to correct single symbol errors and to detect double symbol errors.

2. The digital memory system of claim 1 in which each check bit is generated independently of other ones of said check bits.

3. A method for encoding 64 bits of binary data, said method comprising the step of encoding said bits of data using an electrical circuit defined by a parity check matrix having the form:

|  | CCCC 0000 1234 | CCCC 0000 6789 | CCCC 1111 1234 | CC 01 50 |
|---|---|---|---|---|
| 1000 1000 1000 1000 1000 1000 1000 1000 1000 1000 1000 1000 1000 1000 1000 10001000 | 0000 | 0000 | 00 |
| 0100 0100 0100 0100 0100 0100 0100 0100 0100 0100 0100 0100 0100 0100 0100 01000100 | 0000 | 0000 | 00 |
| 0010 0010 0010 0010 0010 0010 0010 0010 0010 0010 0010 0010 0010 0010 0010 00100010 | 0000 | 0000 | 00 |
| 0001 0001 0001 0001 0001 0001 0001 0001 0001 0001 0001 0001 0001 0001 0001 00010001 | 0000 | 0000 | 00 |
| 0001 1000 0010 0100 1001 0101 1110 1100 0101 1101 1011 1110 0000 0100 0010 1111 0000 | 0000 | 0000 | 10 |
| 0000 0100 0001 1010 0100 1010 1111 1110 0010 1110 0101 0111 1000 0010 1001 1111 0000 | 1000 | 0000 | 00 |
| 1001 0010 0010 0001 1011 1000 0001 0011 1100 1010 1001 0101 0100 0101 0110 10000000 | 0100 | 0000 | 00 |
| 0100 0001 1001 0000 0101 0100 1000 0001 0110 0101 1100 1010 0010 0010 1011 11000000 | 0010 | 0000 | 00 |
| 0010 0000 0100 1000 0010 1010 1100 1000 1011 1010 0110 1101 0001 1001 0101 1110 0000 | 0001 | 0000 | 00 |
| 1000 0001 0100 0010 0101 1001 1100 1110 1101 0101 1110 1011 0000 1010 1010 1000 0000 | 0000 | 0000 | 01 |
| 0100 0000 1010 0001 1010 0100 1110 1111 1110 0010 0111 0101 1000 0101 1101 1100 0000 | 0000 | 1000 | 00 |
| 0010 1001 0001 0010 1000 1011 0011 0001 1010 1100 0101 1001 0100 0000 0100 01100000 | 0000 | 0100 | 00 |
| 0001 0100 0000 1001 0100 0101 0001 1000 0101 0110 1010 1100 0010 1000 1010 00110000 | 0000 | 0010 | 00 |
| 0000 0010 1000 0100 1010 0010 1000 1100 1010 1011 1101 0110 0001 0100 0101 00010000 | 0000 | 0001 | 00 |

4. A method for encoding binary data, said method comprising the step of encoding said bits of data using an electrical circuit defined by a parity check matrix having the form:

$$H = \begin{bmatrix} & 1 & 0 & 0 \\ H_1 H_2 & 0 & 1 & 0 \\ & 0 & 0 & 1 \end{bmatrix},$$

where $$H_1 = \begin{bmatrix} 1 & 1 & 1 & 1 & 1 & 1 & 1 & 1 & 1 & 1 & 1 & 1 & 1 & 1 & 1 & 1 \\ 1 & \alpha & \alpha^2 & \alpha^3 & \alpha^4 & \alpha^5 & \alpha^6 & \alpha^7 & \alpha^8 & \alpha^9 & \alpha^{10} & \alpha^{11} & \alpha^{12} & \alpha^{13} & \alpha^{14} & \alpha^{15} \\ 1 & \alpha^{-1} & \alpha^{-2} & \alpha^{-3} & \alpha^{-4} & \alpha^{-5} & \alpha^{-6} & \alpha^{-7} & \alpha^{-8} & \alpha^{-9} & \alpha^{-10} & \alpha^{-11} & \alpha^{-12} & \alpha^{-13} & \alpha^{-14} & \alpha^{-15} \end{bmatrix},$$

and where $$H_2 = \begin{bmatrix} 1 & 1 & 1 & 1 & 1 & 1 & 1 & 1 \\ \alpha^{16} & \alpha^{18} & \alpha^{22} & \alpha^{24} & \alpha^{25} & \alpha^{27} & \alpha^{29} & \alpha^{30} \\ \alpha^{-16} & \alpha^{-18} & \alpha^{-22} & \alpha^{-24} & \alpha^{-25} & \alpha^{-27} & \alpha^{-29} & \alpha^{-30} \end{bmatrix},$$

where $\alpha$ is a root of the irreducible binary polynomial $p(x)=1+x^2+x^5$ and wherein the second row of the matrix $H_2$ above is selected so that it contains all the elements $\alpha^i$ for $16 \leq i \leq 30$, and the binary representation of $1/(\alpha^i+\alpha^{-i})$ has a one as the coefficient of the constant term.

* * * * *